No. 857,583. PATENTED JUNE 25, 1907.
J. M. BOYLE.
CORE FOR MOLDING HOLLOW CEMENT OBJECTS.
APPLICATION FILED JAN 23, 1907.

WITNESSES:
Gustave Dieterich
Edwin H. Dieterich

INVENTOR
James M. Boyle
BY Park Benjamin
his ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

CORE FOR MOLDING HOLLOW CEMENT OBJECTS.

No. 857,583.     Specification of Letters Patent.     Patented June 25, 1907.

Application filed January 23, 1907. Serial No. 353,694.

*To all whom it may concern:*

Be it known that I, JAMES M. BOYLE, a citizen of the United States, residing at New York, in the county of New York and State of New York, have invented a certain new and useful Improvement in Cores for Molding Hollow Cement Objects, of which the following is a specification.

The invention relates to the manufacture of hollow objects, such as pipes, conduits, columns, etc., molded from a plastic material capable of hardening, substantially as set forth in U. S. Patent No. 830,204, granted to me September 4, 1906, upon a core of flexible material which is distended by fluid pressure.

The invention consists in the construction of the distensible core, whereby there may be produced a hollow object having in the periphery of its bore or inclosed space, a recess, depression or cavity. In the embodiment of my invention here illustrated, I show a conduit having a cylindrical bore, in the periphery of which there may be any desired number of grooves or channels. Such grooves are useful for many purposes, and especially for the laying of electrical conductors, such as telegraph, telephone or trolley wires, when the main portion of the conduit bore is devoted to other uses.

Figure 1:
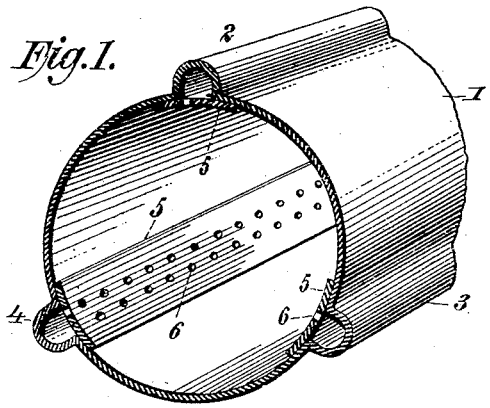
Figure 2:
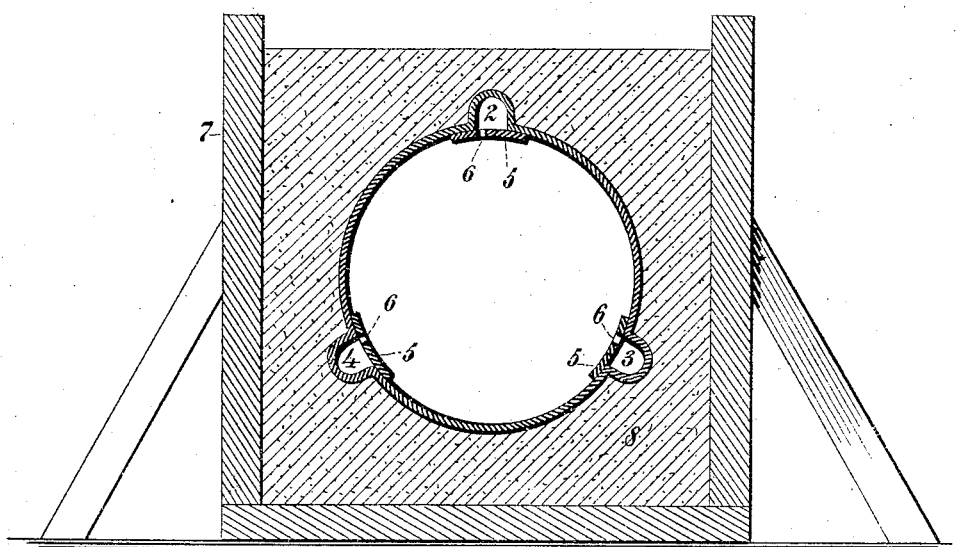
Figure 3:
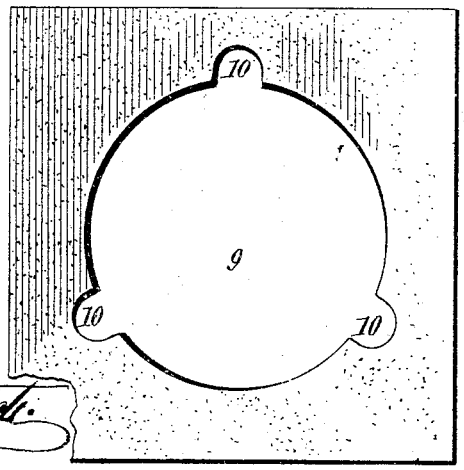

In the accompanying drawings—Figure 1 is a perspective view of my improved flexible distensible core. Fig. 2 is a cross section, showing said core in place in the mold embedded in cement or other plastic material, which is to form the conduit. Fig. 3 is a cross section of the completed conduit, the core having been removed.

Similar numbers of reference indicate like parts.

1 is the core made, in tubular form, of any suitable flexible material, such as a fabric covered with rubber. In the wall of the core I produce a longitudinal externally protruding corrugation as 2, or several such corrugations as 2, 3, 4. In order to retain the corrugation in place and prevent its being flattened out and so obliterated when the core is distended by internal pressure, I secure on the inner periphery of the core and extending across the corrugation recess, a bridge piece 5, which may be of the same material as that of which the core itself is composed. This bridge piece may be cemented to the inner periphery of the core, or secured in any other suitable way. In said piece 5, are apertures 6, to permit the distending fluid to fill the interior of the corrugation.

One practical mode of using my improved core to make conduits of cement or similar material, is as follows: The core being distended by internal fluid pressure, is disposed in a mold 7, which receives the plastic material 8, such as cement, in which said core becomes embedded. After the plastic material has hardened sufficiently to retain its shape, the distending fluid within the core is allowed to escape, and then the core itself may, if desired, be removed. The result will be the production of a tubular bore 9, Fig. 3, having in its periphery as many longitudinal grooves or channels 10, as there are corrugations formed in the wall of the core.

I claim:—

1. A distensible core of flexible material having on its outer surface a longitudinal hollow corrugation, said corrugation having its sides disposed at an angle to the circumferential periphery of said core, and means for preventing obliteration of said corrugation by internal fluid pressure.

2. A distensible core of flexible material, having on its outer surface a longitudinal hollow rib, having its sides disposed at an angle to said core and, in its base, openings for receiving distending fluid from the interior of said core.

3. A distensible tubular core of flexible material having on its outer surface a plurality of longitudinal corrugations and means for preventing obliteration of said corrugations by internal fluid pressure.

4. A distensible tubular core of flexible material having on its outer surface a longitudinal corrugation, and a perforated strip of flexible material secured on the inner periphery of said core and everywhere bridging said corrugation recess.

In testimony whereof I have affixed my signature in presence of two witnesses.

JAMES M. BOYLE.

Witnesses:
     JEANNIE HASTIE,
     GERTRUDE T. PORTER.